Aug. 21, 1956   F. HAALCK   2,760,154
MAGNETOMETER, MAINLY FOR GEOMAGNETIC DETERMINATIONS
Filed Jan. 28, 1953
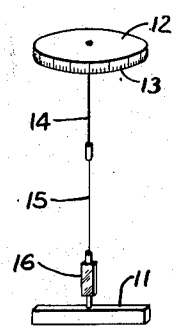
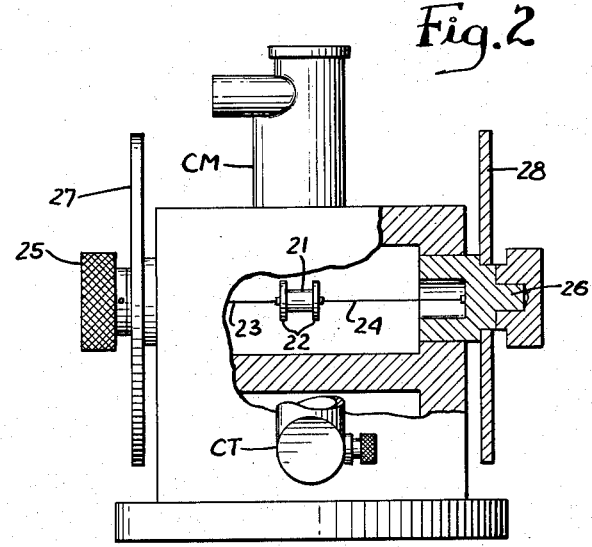
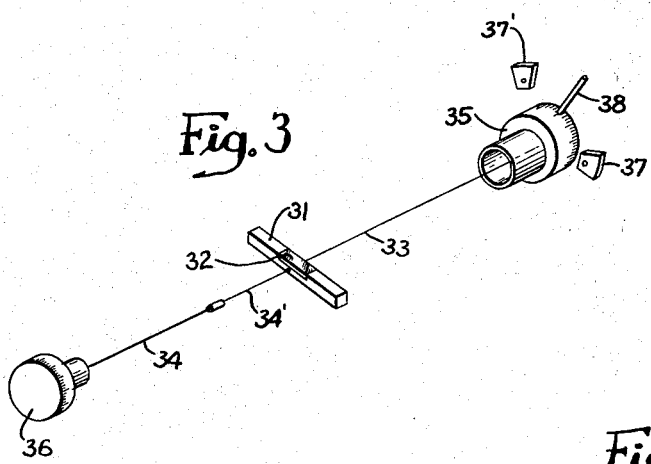
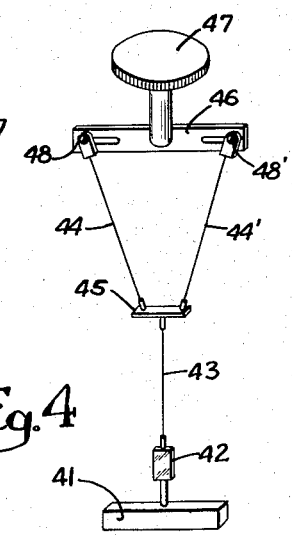

United States Patent Office 2,760,154
Patented Aug. 21, 1956

2,760,154

MAGNETOMETER, MAINLY FOR GEOMAGNETIC DETERMINATIONS

Fritz Haalck, Berlin-Wilmersdorf, Germany, assignor to Askania Werke, A. G., a German corporation Application January 28, 1953, Serial No. 333,809

Claims priority, application Germany February 4, 1952

18 Claims. (Cl. 324—48)

This invention relates to magnetometers, mainly for precise determinations of geomagnetic data.

Instruments of this type are almost invariably used in the open, where they are subject to great temperature variations. Now the magnetic moment upon which these instruments rely is inversely proportional to temperature. Therefore it was necessary in the past to make a measurement of field temperature for each measurement of magnetic data and to correct the latter mathematically for some standard temperature. This was time consuming and tedious.

Attempts have been made to construct a self-compensating magnetometer, wherein temperature-conditioned changes of magnetic moment are automatically offset by corresponding changes in other factors affecting the balance of the magnetic system. For instance, bifilar horizontally suspended systems have been equipped with rods having different coefficients of thermal expansion. For further adjustment, counterweights were threaded upon such rods. However, there are several objections to such rods. They increase the mass of the system, subjecting sensitive torsion wires to excessive tension. Further adjustment of the rods and counterweights is practically impossible in the field; most delicate instruments are required. Still further, the application of the rod and counterweight method is limited; it fails in the vertically suspended torsion balance which is frequently desired for the measurement of horizontal intensity and declination. In connection with these latter, vertically suspended balances it has been attempted to compensate for the changing magnetic moment of the magnet by inducing corresponding changes in the magnetic field; that is, by installing magnetic inductors the permeability of which depends significantly on temperature. However, it is impossible to obtain a sufficiently linear compensation by such induction.

According to the present invention, temperature compensation of magnetic moment is obtained in a basically different manner; that is, by utilizing the effect of temperature upon the elastic torsion modulus of the torsion fibers, in order to compensate the effect of temperature upon magnetic balance. This principle can be used with vertical and horizontal torsion fibers. It involves no significant increase in moving mass. It can be developed so as to make all required calibrations, readjustments and the like sufficiently simple for execution in the field. In other words, the shortcomings of the earlier attempts are avoided. At the same time, the extra cost of construction is insignificant.

The general principles, features and advantages of the new instrument and certain detailed objects connected therewith will be understood upon a study of the specific disclosure which follows.

In the drawing:

Figure 1 is a highly diagrammatic perspective view of a first instrument in accordance herewith.

Figure 2 is a somewhat more detailed front view, partly in section, of a modified instrument.

Figures 3 and 4 are views generally similar to Figure 1 but showing further modifications.

Figure 1 shows a small permanent magnet 11, which may be made of an aluminum-nickel-cobalt alloy or the like. It is suspended from a torsion head 12. Angular graduations 13 are marked on the torsion head. The suspending fiber (that is tape, wire or other filament) consists of two portions: an upper vertically extending fiber portion 14, which may be of quartz and a lower vertically extending fiber portion 15, which may be of tungsten. At the lower end of the latter portion, a small, flat mirror 16 is suspended, which is rigidly connected with the center of the horizontally extending magnet 11. The angular position of the magnet-mirror system 11, 16, is measured (that is, observed, or mechanically indicated or recorded or otherwise utilized) through a suitable viewing system (not shown).

The simple instrument is basically operated in well-known manner. For instance the declination can be determined by observing the degree of torsional re-adjustment required at 13 in order to return the mirror 16 from deflected to null position; and horizontal intensity can be determined by first deflecting the magnet 11 and then counting its resulting oscillations per unit of time.

These operations, as noted above, require temperature compensation. In order to make fine adjustments in this respect, the relative length of the filaments 14, 15 can be changed; for instance by raising the entire system 14, 15, 16, 11 relative to the torsion head 12. For more pronounced readjustments of temperature compensation it is necessary to install different wires 15 and/or 14, modifying them as to material use. Still sharper variation is possible by variation of wire diameters. This will be clear from the following consideration:

The fiber portions 14, 15 may differ in length (L), radius (R) and/or modulus of torsion or shear (G); that is, in one, two or three of the factors determining the torsional moment of the fiber at any angle (A) of torsion. The torsional moment is $$M_T = -\frac{AR^4 G\pi}{2L}$$

The value of the torsion modulus (G) for different filament materials changes in different manners with the prevailing temperature. According to the basic principle of the present invention, the filament materials are selected to yield an average torsion modulus (G), and accordingly a temperature controlled variation of the torsional moment ($M_T$) which has a direction opposite to the direction of the temperature-controlled variation of the magnetic torque moment ($M_M$); and desirably the magnitude of the so-selected torsional moment variation is made equal to the magnitude of said magnetic torque moment variation.

For instance, the materials of the two fibers 14, 15 can be selected so that, if a certain temperature variation ($D_T$) causes a certain increment ($+\Delta M_M$) in the magnetic torque moment ($M_M$) acting on the magnet 11, the same temperature variation ($D_T$) causes an equal decrement ($\Delta G$ or $-\Delta M_T$) in the torsional modulus (G), or moment ($M_T$) of the complete torsion fiber system 14, 15. In other words, there is used a filament material and filament means having preselected thermo-elastic characteristics $$(\Delta_v{}^x G)$$

adapted to counteract and preferably to compensate the predetermined thermomagnetic characteristics $$(\Delta_v{}^x M_M)$$

of the magnet, upon a temperature change $$(\Delta_v{}^x)$$

from $x$ to $y$ degrees.

The exact selection of materials for fiber portions 14 and 15, to satisfy the foregoing requirement of the present invention, can be made in well-known manners, the details of which may vary widely. This latter variation is due to the fact that the exact value of the magnetic moment ($M_M$) itself depends on several variables, including magnetic and geometric constants of the magnet 11.

In connection with some types of material for this magnet 11 it is possible to satisfy the above-mentioned requirement of the present invention, at least approximately, with a fiber system using a single, homogeneous fiber extending from the torsion head 12 to the mirror 16 and having uniform radius throughout.

However, a much more accurate compensation is possible with a plurality of fiber portions 14, 15 which differ from one another as to thermo-elastic characteristics G and also as to one or more of their other characteristics or constants (R, L). Moreover, this accurate compensation is allowed, by suitable variation of fiber portions, for practically any and all of a wide range of magnetic materials which may be used at 11.

Frequently it is advantageous to utilize one fiber portion, such as 14, the torsion moment of which increases when the magnetic torque moment does, although not necessarily in direct proportion therewith. Another fiber portion, such as 15, can then be selected for a torsion moment which decreases relatively strongly when the magnetic torque moment increases, due to changed temperature. A suitable average temperature coefficient ($d\ G$) of the torsional moment variation, for the complete fiber system 14, 15, is then obtained by utilizing predetermined ratios of radii (R) and/or partial lengths (L) for the two portions 14, 15.

Referring now to Figure 2: this embodiment uses an instrument of the kind as described in the copending application S. N. 277,331, filed March 18, 1952 now issued as Patent 2,629,003. Here the mirror 21 is symmetrically secured (by cementing or the like) to and between a pair of magnet discs 22, held in parallel vertical planes and having parallel and uniformly oriented magnetic axes. The magnet system 22 with mirror 21 is suspended on a horizontal bifilar torsion system, using for instance a quartz filament 23 at left and a tungsten filament 24 at right. These two filaments are selected as to diameter and exact material used, in the same manner as described above. They are held, respectively, by torsion heads 25, 26; and their respective degrees of torsion are indicated by protractors 27, 28, observed through a microscope CT. The mirror 21 is observed through a telescope CM.

The operating procedure for the device of Figure 2 is basically the same as described in said patent. Adjustments as to temperature compensation can be made in this case by changing the angular orientation of the torsion head 25 relative to the left-hand magnet 22, or the angular orientation of the torsion head 26 relative to the right-hand magnet 22, whereupon the angular orientation of the protractors 27, 28 may be readjusted.

These adjustments can be made in the field. However, they are particularly useful also in the original shop calibration of the instrument, or in case of re-calibration. In this connection it must be considered that different samples of quartz, tungsten and the like differ as to their exact modulus of elasticity and as to the exact effect thereon of different temperatures. The slight errors which are likely to be caused by different material constants can be corrected, in the system of Figure 2, by a slight variation of the relative positions of the null points of the two torsion heads 25, 26. Thereupon, it is merely necessary to maintain the same proportion between the angularities of the two torsion heads, relative to the magnetic axis, if and when the relative position of the torsion heads is changed for the purpose of modifying the measuring scope or application of the instrument; for instance for changing from measurements of vertical intensity to those of horizontal intensity.

It will be understood that a number of parts, such as calibrating coils, protective holders for the magnet system, etc. will often be added to the simple instrument as shown in Figure 2.

Referring now to Figure 3: here the magnet, diagrammatically shown at 31 is suspended on a horizontal bifilar torsion system using three fibers in series; for instance a thin metal wire 33 at right and heavier quartz and tungsten fibers 34, 34' at left.

This arrangement has certain advantages of Figure 1, wherein variation is possible as to the factor L, the length of the different fiber portions. It also has all of the advantages of Figure 2, such as the possibility of measuring flux directions and intensities in different planes.

Moreover the three wire system of Figure 3 facilitates compensation still further. It compensates the entire change of moment that is due to the changing temperatures. This entire change, in Figures 2 and 3, comprises a change of the magnetic torque moment, together with any change of mechanical torsional moment caused by static unbalance of the magnet system about its horizontal torsion axis. Attempts are generally made to reduce the static unbalance to zero, by the use of symmetry in the distribution of matter. Indeed it is possible in precision instruments to achieve a very high degree of such symmetry and balance; however, at least some residual unbalance is unavoidable, mainly due to the effect of temperature itself. In the instrument of Figure 3 the fiber portions 34, 34' can be selected as to relative length, diameter and materials, as in Figure 1, at least in some cases. Their final shop adjustment, in this respect, can be effected by their torsion head 36, as in Figure 2. Moreover, a separate shop or field adjustment of mechanical unbalance, due to thermal displacement of the center of gravity of the magnet-mirror system 31, can be effected separately by the wire 33 and its torsion head 35.

Field adjustments can further be facilitated by the provision of angular stops 37, 37', rotatable about the corresponding torsion head; as shown on torsion head 35. By this expedient, together with the three-wire system, the operator can change from measurements of horizontal intensity to those of vertical intensity, and vice versa, without even stopping to maintain the proportional ratio between the pre-established angles of relative torsion, applied in the final shop calibration of the instrument as described in connection with Figure 2.

The angular adjustment of the stops 37, 37' can and should be selected so as to compensate not only for the variation of magnetic moment ranges, inherent in the transition from inclinometer to declinometer operation, but also to compensate for the known fact that incident to such transition the mechanical unbalance, existing at any one temperature, changes magnitude and direction.

With some magnets, the system of Figure 3 can also be constructed with a left-hand fiber of homogeneous material and radius, selected in such manner as has been described for the simplest variant of Figure 1. However, the three-wire system is preferred since it makes the possible shop and field adjustments simpler as well as finer.

Referring finally to Figure 4: here the magnet 41, rigid with the mirror 42 is again suspended on a vertical fiber portion 43, for instance quartz. An upper fiber system is here formed by two fiber portions 44, 44', for instance of similar (or sometimes dissimilar) tungsten alloys. These upper fibers are arranged symmetrically with the lower fiber portion 43, and interconnected therewith by a small fitting 45. The upper ends of the fibers 44, 44' are attached to a horizontal bar 46, rigid with the vertically oriented torsion head 47. The connection between the fiber portions 44, 44' and the bar 46 is made by connector clips 48, 48', which can be shifted along the bar 46. One or both of these connector clips, for instance 48, can also be disconnected and turned about the axis of the respective fiber 48.

Such horizontal shifting or axial torsion of one or both connectors 48 allows a shop adjustment, in a vertically suspended balance, similar to that described for Figure 2. It will be noted that in this case, two of the three wires are arranged side by side. In principle this would also be possible in Figure 2 or 3; however, it is more important in connection with the vertical suspension of Figure 4.

Various further modifications are possible. The scope of the invention is claimed as follows:

I claim:

1. A magnetometer comprising a small permanent magnet; filament means supporting the magnet and having a temperature coefficient of torsional moment variation preselected to counteract the thermal variation of the magnetic torque moment; and means for measuring the position of the magnet.

2. A magnetometer comprising a small permanent magnet; filament means supporting the magnet and having preselected material characteristics as to thermal variation of elastic torsion modulus and other preselected characteristics affecting the torsional moment of a torque applied to the filament means, said material characteristics and other characteristics jointly tending to compensate the temperature coefficient of magnetic torque moment; and means for measuring the position of the magnet.

3. A magnetometer comprising a small permanent magnet; filament means supporting the magnet and having characteristics as to thermal variation of its torsional moment so as to vary such moment in a direction opposite that of the thermal variation of the magnetic torque moment; and means to measure the position of the magnet.

4. A magnetometer as described in claim 3 wherein said characteristics are preselected to yield a thermal variation of the torsional moment of the filament means which variation has a magnitude equal to that of said thermal variation of the magnetic torque moment.

5. A magnetometer comprising a small permanent magnet; filament means supporting the magnet and comprising at least two filament portions interconnected endwise and having different thermal coefficients of variation of torsional moment, said coefficients being selected to jointly counteract the thermal variation of the magnetic torque moment; and means to measure the position of the magnet.

6. A magnetometer as described in claim 5 wherein the filament means comprises at least three filament portions in at least two of which said coefficients differ from one another.

7. A magnetometer as described in claim 6, wherein all three filament portions have different values of said coefficients.

8. A magnetometer as described in claim 5 wherein one of the filament portions comprises a pair of fibers extending side by side and connected for individual adjustment.

9. A magnetometer comprising a pair of horizontally oriented, spaced, coaxial torsion heads facing one another; a magnet therebetween, with a magnetic axis at right angles to the axis of the torsion heads; means to measure the position of the magnet; and a filament system interconnecting the magnet with the two torsion heads and comprising at least two filament portions interconnected endwise and having different thermal coefficients of torque moment variation, selected to jointly counteract the thermal variation of magnetic torque moments.

10. A magnetometer as described in claim 9 wherein one of said filament portions interconnects the magnet with one of the torsion heads and another interconnects it with the other torsion head.

11. A magnetometer as described in claim 10 wherein one of the filament portions, comprises two fibers interconnected endwise and having different values of said coefficients.

12. A magnetometer as described in claim 11 wherein one of said fibers has said coefficient selected so as to add to temperature controlled variations of magnetic torque moment and the other has said coefficient selected so as to subtract therefrom.

13. A magnetometer as described in claim 11 additionally comprising a mechanism connected with one of the torsion heads and adapted to limit adjustments of such torsion head to predetermined angular distances.

14. A magnetometer comprising a vertically oriented torsion head; a filament system suspended therefrom; a magnet suspended from the lower end of the filament system with a magnetic axis at right angles to the axis of the torsion head; and means to view the declination of the magnet if any; the filament system comprising at least two superposed, interconnected fiber units of an elasticity individually selected for each unit and further selected so that the elastic resistance to magnetic torque acting on the magnet varies with prevailing temperatures, to an extent similar to the manner in which the magnetic torque itself varies with prevailing temperatures, the elastic resistance however varying so as to counteract the changes in magnetic torque.

15. A magnetometer as described in claim 14 wherein said fiber units differ as to thickness as well as elasticity.

16. A magnetometer as described in claim 14 wherein the material of one of said fiber units is selected so that its elasticity increases upon a rise in temperature and that of the other is selected so that its elasticity decreases upon such rise.

17. A magnetometer as described in claim 14 wherein one of the superposed fiber units comprises a pair of fibers connected side by side and means to vary the distance between the fibers of such pair at least at one end thereof.

18. A magnetometer as described in claim 14 wherein one of the superposed fiber units comprises a pair of fibers connected side by side and means to twist at least one of the fibers of such pair independently of the other.

References Cited in the file of this patent

UNITED STATES PATENTS

| | | |
|---|---|---|
| 2,596,638 | Arvela | May 13, 1952 |
| 2,629,003 | Haalck | Feb. 17, 1953 |